United States Patent
Seifert et al.

(10) Patent No.: US 10,719,450 B2
(45) Date of Patent: Jul. 21, 2020

(54) STORAGE OF RUN-LENGTH ENCODED DATABASE COLUMN DATA IN NON-VOLATILE MEMORY

(71) Applicant: SAP SE, Walldorf (DE)

(72) Inventors: Sebastian Seifert, Heidelberg (DE); Christian Lemke, Karlsruhe (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/229,313

(22) Filed: Dec. 21, 2018

(65) Prior Publication Data

US 2019/0347209 A1 Nov. 14, 2019

(30) Foreign Application Priority Data

May 10, 2018 (IN) ............................ 2018 1 1017604

(51) Int. Cl.
*G06F 12/10* (2016.01)
*G06F 12/02* (2006.01)
(Continued)

(52) U.S. Cl.
CPC .............. *G06F 12/10* (2013.01); *G06F 3/064* (2013.01); *G06F 3/067* (2013.01); *G06F 3/0607* (2013.01); *G06F 3/0631* (2013.01); *G06F 12/0223* (2013.01); *G06F 12/0246* (2013.01); *G06F 12/0646* (2013.01); *G06F 16/221* (2019.01); *G06F 2212/1008* (2013.01); *G06F 2212/163* (2013.01); *G06F 2212/205* (2013.01); *G06F 2212/657* (2013.01); *G06F 2212/7202* (2013.01)

(58) Field of Classification Search
CPC ............................ G06F 12/10; G06F 16/1787
See application file for complete search history.

(56) References Cited

U.S. PATENT DOCUMENTS 9,195,657 B2* 11/2015 Oks ......................... G06F 16/00
2003/0093643 A1* 5/2003 Britt, Jr. .................. G06F 8/658
711/170

(Continued)

*Primary Examiner* — Edan Orgad
*Assistant Examiner* — Won Tae C Kim
(74) *Attorney, Agent, or Firm* — Buckley, Maschoff & Talwalkar LLC (57) ABSTRACT

A system in which a volatile random access memory stores first header data, second header data, a first logical array in a first contiguous memory block and a second logical array in a second contiguous memory block. Each array position of the first logical array stores a database column value, and each array position of the second logical array stores an indication of a number of consecutive occurrences of a database column value. The first header data includes a first pointer to the first memory block, and the second header data includes a second pointer to the second memory block. A memory size is determined associated with the first header data, the second header data, the first memory block, and the second memory block, a first memory block of the non-volatile random access memory is allocated based on the determined memory size, an address of the random access memory associated with the allocated first memory block is determined, and a portion of the first header data, a portion of the second header data, a binary copy of the first memory block and a binary copy of the second memory block are written at the address of the random access memory.

17 Claims, 9 Drawing Sheets

(51) Int. Cl.
     *G06F 16/22*     (2019.01)
     *G06F 12/06*     (2006.01)
     *G06F 3/06*      (2006.01)

(56) References Cited

U.S. PATENT DOCUMENTS

| | | | | |
|---|---|---|---|---|
| 2008/0162782 | A1* | 7/2008 | Suresh | G06F 12/0246 |
| | | | | 711/103 |
| 2017/0212831 | A1* | 7/2017 | Lee | G06F 12/023 |
| 2017/0264311 | A1* | 9/2017 | Miyamae | H03M 7/6082 |
| 2019/0347206 | A1* | 11/2019 | Thiel | G06F 16/221 |

* cited by examiner

|   | Value |
|---|---|
| 0 | Start Value |
| 1 | Start Value |
| 2 | Start Value |
| 3 | Start Value |
| ... | ... |
| N | Start Value |

|   | Run-Length |
|---|---|
| 0 | Run-Length |
| 1 | Run-Length |
| 2 | Run-Length |
| 3 | Run-Length |
| ... | ... |
| N | Run-Length |

*FIG. 11A*

|   | Value |
|---|---|
| 0 | 0 |
| 1 | 2 |
| 2 | 3 |
| 3 | 7 |
| 4 | 3 |

|   | Run-Length |
|---|---|
| 0 | 4 |
| 1 | 2 |
| 2 | 8 |
| 3 | 2 |
| 4 | 5 |

STORAGE OF RUN-LENGTH ENCODED DATABASE COLUMN DATA IN NON-VOLATILE MEMORY

CROSS-REFERENCE TO RELATED APPLICATIONS

This application is related to, and claims benefit of and priority to, Indian Provisional Patent Application No. 201811017604, filed May 10, 2018, the contents of which are hereby incorporated by reference in their entirety for all purposes.

BACKGROUND

Non-Volatile Memory (NVM) provides an intermediate alternative between high-performance Dynamic Random Access Memory (DRAM) and cost-effective hard disk drives (HDDs). Generally, the read performance of NVM is similar to DRAM and the write performance of NVM is significantly faster than HDDs. Moreover, NVM is byte-addressable and writes to NVM are durable, so data stored therein may be accessed directly after a crash and restart, as opposed to reloading such data from HDD into DRAM.

Traditionally, data is stored in DRAM in a tree format including a root node and leaves, with DRAM pointers to downstream leaves. To persist the data, the data is written to HDD in the same format. Specifically, the root node and leaves are written into a persistence file as separate binary chunks, with their pointers mapped to account for offsets of bunches of leaves which point to the start of a new data block. A similar persistence format may be used to persist the data in NVM. As a result of this persistence format, the time required to load persisted data from NVM into DRAM is dependent on the volume of persisted data. Also, the storage of pointers in NVM can be problematic since the same data may not be assigned a same address each time it is mapped to virtual space.

NVM has been considered as a medium to persist database tables. In some implementations, each database table partition includes a delta column fragment and a main column fragment for each of its table columns. A main column fragment may include a column vector of value IDs, a dictionary mapping each value ID to a value, and data structures such as an index mapping dictionary value IDs to positions of the column vector which store each value ID. Although use of a dictionary reduces the amount of memory needed to store the main column fragment (i.e., dictionary compression), database systems may employ additional compression schemes to the column vector of value IDs. It is desirable to persist thusly-compressed main column fragments in and load these main column fragments from NVM while addressing the shortcomings of conventional persistence methods.

DETAILED DESCRIPTION

According to some embodiments, in-memory data is written to NVM such that, during load, the data (and any sub-structures) are mapped to an in-memory virtual address space such that the data (and any sub-structures) may be accessed directly via the virtual address space. Some embodiments include an alignment gap when writing to NVM to ensure the persisted data is aligned (e.g., 64-bit aligned), thereby facilitating in-memory manipulation of the data.

Some embodiments provide writing of data to NVM in larger binary data blocks than in prior persistence formats. Embodiments may also or alternatively write offsets to sub-positions at the beginning of the binary data blocks to facilitate calculation of pointers to sub-parts of the data block during deserialization. Advantageously, such offsets avoid a need to persist pointers within NVM.

Loading of persisted data blocks into DRAM may therefore include mapping to a virtual memory space and pointer reconstruction. The persisted data blocks may then be accessed directly from the virtual memory space, and in an aligned format particularly suitable for access by conventional memory algorithms.

Some embodiments provide efficient persistence of compressed column value IDs in NVM from DRAM and loading of persisted compressed column value IDs from NVM into DRAM. In some embodiments, a main column fragment may be persisted in NVM as one memory block consisting of a compressed column vector, a dictionary and an inverted index, written sequentially to NVM with one entry point to the main column fragment.

Figure 1:
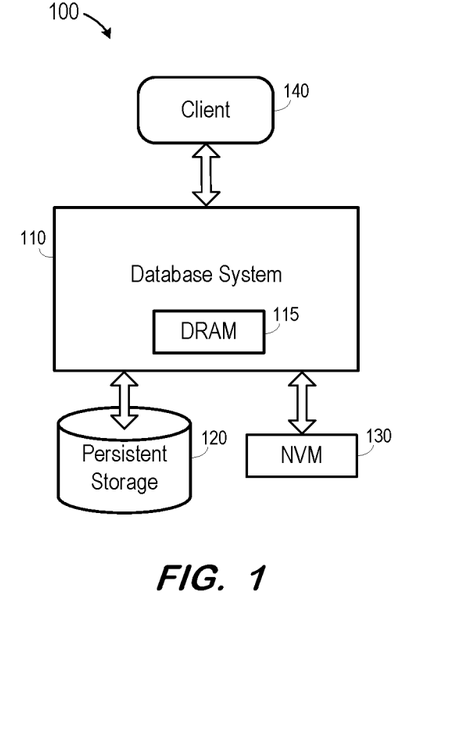
FIG. 1 is a block diagram of a system according to some embodiments.

FIG. 1 is a block diagram of system 100 according to some embodiments. System 100 includes database system 110, persistent storage 120, NVM 130, and client 140. According to some embodiments, database system 110, persistent storage 120 and NVM 130 may operate to serve transactional and analytical data to client 140 based on requests received therefrom.

Database system 110 may comprise any query-responsive database system that is or becomes known, including but not limited to a structured-query language (i.e., SQL) relational database management system. Database system 110 generally provides data to reporting clients, such as client 140, in response to instructions (e.g., SQL statements) received therefrom. In some embodiments, database system 110 receives an instruction from client 140. Database system 110 generates a statement execution plan based on the instruction and on stored metadata describing the data of the database. The statement execution plan is forwarded to storage layer of database system 110, which executes the plan and returns a corresponding dataset. Database system 110 then returns the dataset to client 140. Embodiments are not limited thereto.

Database system 110 may comprise an "in-memory" database, in which DRAM 115 is used for cache memory and for storing the full database during operation. According to some embodiments, DRAM 115 may be used to store portions of the full database while NVM 130 is used to store other portions of the full database. As mentioned above, the portions stored by NVM 130 are persisted and therefore need not be reloaded after a database or server restart.

In some embodiments, the data of database system 110 may comprise one or more of conventional tabular data, row-based data stored in row format, column-based data stored in columnar format, and object-based data. Moreover, the data of database system 110 may be indexed and/or selectively replicated in an index to allow fast searching and retrieval thereof.

Persistent storage 120 may comprise one or more non-volatile data storage units (e.g., fixed disks) storing a relational database, a multi-dimensional database, an eXtendable Markup Language (i.e., XML) document, or any other structured and/or unstructured data. Persistent storage 120 may also store log volumes, data backups, and/or other suitable data. The data of persistent storage 120 may be distributed among several non-volatile data storage units. Embodiments are not limited to any number or types of non-volatile data storage units.

NVM 130 may be implemented using flash-based memory connected to a processor vie PCIe interconnect technology, but other variants are known, including but not limited to 3D XPoint, Phase-change Random Access Memory, Magnetic Random Access Memory, and Memristors. NVM 130 may exhibit a Dual In-Line Memory Module (i.e., DIMM) form-factor and may therefore interface with a Central Processing Unit (i.e., CPU) of database system 110 as RAM (e.g., byte-addressable, directly accessible using load/store instructions, and covered by CPU cache-line handling, including cross-socket cache coherency) rather than as a block device. According to some implementations, the device latency of NVM 130 is close to that of DRAM 115 and its bandwidth lower than that of DRAM 115.

Client 140 may comprise one or more devices executing program code of a software application for presenting user interfaces to allow interaction with database system 110. Presentation of a user interface may comprise any degree or type of rendering, depending on the type of user interface code generated by database system 110. For example, client 140 may execute a Web Browser to receive a Web page (e.g., in HTML format) from database system 110, and may render and present the Web page according to known protocols. Client 140 may also or alternatively present user interfaces by executing a standalone executable file (e.g., an .exe file) or code (e.g., a JAVA applet) within a virtual machine.

Although embodiments are described with respect to system 110, which reflects "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. System 110 may also or alternatively support multi-tenancy by providing multiple logical database systems which are programmatically isolated from one another.

Data structures are commonly created and populated in volatile memory such as DRAM, and once populated, data structures may be persisted in persistent memory such as NVM described herein. Once persisted in persistent memory, a data structure can be destroyed from volatile memory when not needed. Then, if the data structure is again needed in memory at a future time, the data structure can be reconstructed from the information persisted in persistent memory. "Loading" a data structure refers to the reconstruction of a data structure in volatile memory from the information persisted in persistent memory. The persisted representation of the data structure may not match the representation in memory, but the persisted information is sufficient to allow full reconstruction of the data structure in volatile memory.

Figure 2:
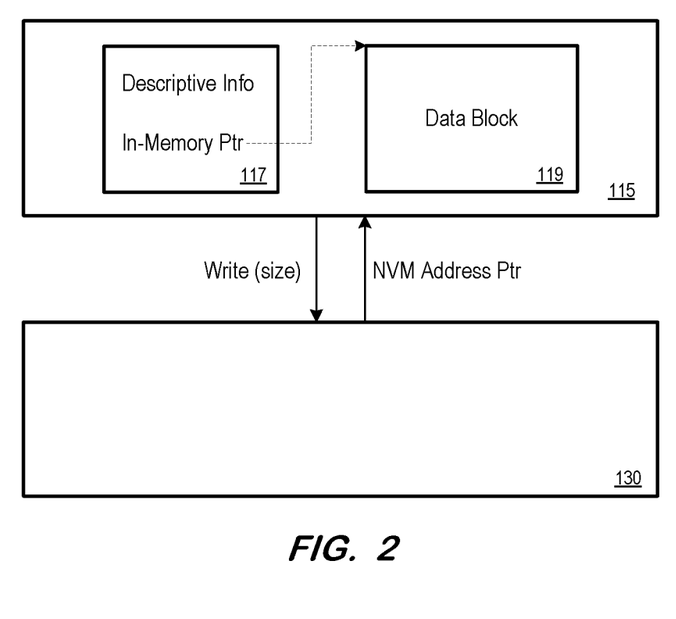
FIG. 2 illustrates an in-memory data representation according to some embodiments.

FIG. 2 illustrates data residing in DRAM 115 according to some embodiments. The data includes header 117 and data block 119. Header 117 includes descriptive information regarding data block 119 and a pointer to data block 119.

According to some embodiments, data block 119 comprises a generic index in which each entry in the index includes a value. In one usage, the index represents a table column and each entry (i.e., row) is a column value or a value ID which points to a column value stored in a dictionary. The descriptive information of header 117 may include, for example, a version number, a size of each entry (i.e., a number of bits used to encode each entry), and a total size of data block 119.

Although data block 119 (and each other DRAM data block described herein) is depicted as a contiguous element, data block 119 (and each other data block) may consist of many chunks of data stored at non-contiguous memory addresses of DRAM 115. For example, data block 119 may comprise a linked tree-like structure of leaves, where the data of each leaf is stored at an allocated address space which is independent of address spaces at which other leaves are stored.

FIG. 2 also illustrates an instruction to write data block 119 to NVM 130. The write instruction may pass the size of the data block to NVM 130. According to some embodiments, a memory block is allocated in NVM 130 based on the size, and a pointer to an address of NVM 130 is returned. The data is then written to NVM 130 at the address as shown in FIG. 3.

Before creating block 135 in NVM 130, a "dry run" of the serialization may be executed to determine the required size of block. According to some embodiments, writing of the data includes adding alignment bits to blocks of memory which are to be aligned in the virtual address space of DRAM 115 upon re-loading of the data. The dry run therefore sums up the size of all data elements including such alignment bits, but does not copy any data. Consequently, fragmentation is reduced as is any need to move the memory block to a different location after serialization.

Figure 3:
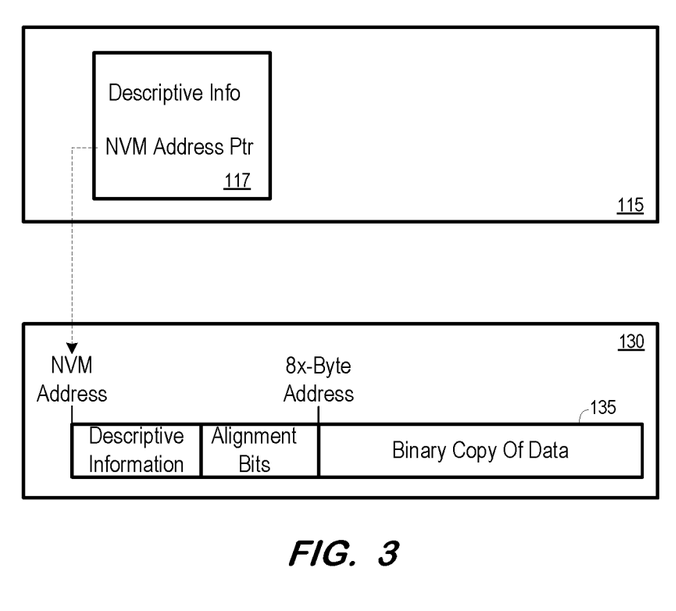
FIG. 3 illustrates writing in-memory data to non-volatile memory according to some embodiments.

As shown in FIG. 3, memory block 135 includes contiguous descriptive information, alignment bits and a binary copy of the data to be persisted. The descriptive information may be identical to, similar to, or completely different from the descriptive information of header 117. According to some embodiments, the descriptive information indicates a size of memory block 135.

The number of alignment bits of memory block 135 are determined such that a start address of the binary copy of data is divisible by 64-bits. As mentioned above, such alignment may be particularly suited to algorithms to be executed on the data. Embodiments are not limited to 64-bit alignment, and may implement any other suitable bit-sized alignment.

As also illustrated in FIG. 3, only descriptive information and pointers to content data are kept in DRAM 115, with the pointers being switched from DRAM addresses to corresponding addresses of the mapped NVM block 135. Previous DRAM memory used for content data 119 is freed. With NVM block 135 mapped in the virtual address space, the data may be accessed directly from NVM block 135 during all subsequent accesses.

Figure 4:
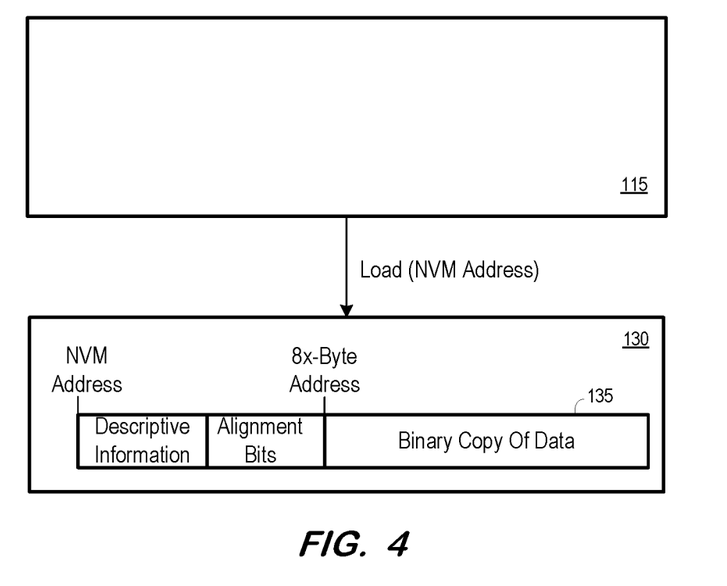
FIGS. 4 and 5 illustrate loading data from non-volatile memory to volatile memory according to some embodiments.
Figure 5:
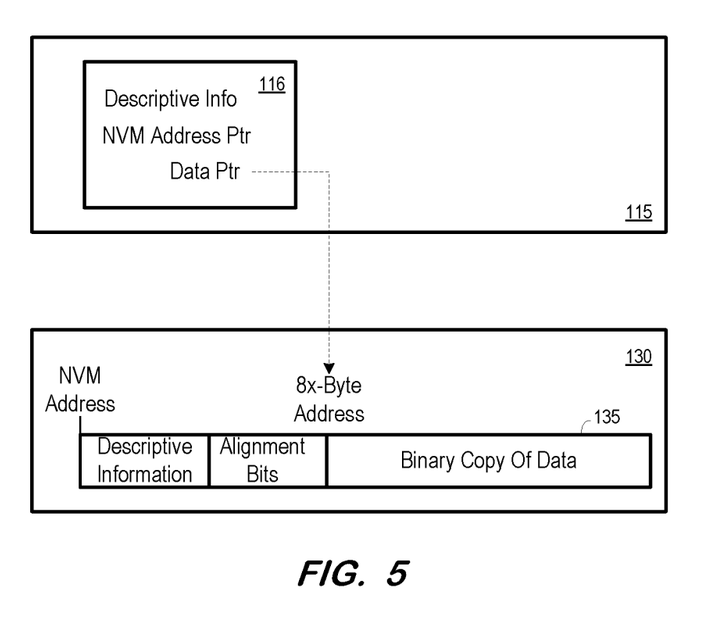

FIGS. 4 and 5 illustrate loading of data previously written into NVM 130 according to some embodiments. It is assumed that no artifacts of the data reside in DRAM 115 (e.g., after a system restart). Loading begins by requesting the data from an NVM address, where the NVM address of a desired block is persisted elsewhere in the system. The block located at the address (e.g., NVM block 135) is deserialized and the descriptive information is copied into header 116 of DRAM 115. Pointers to content data are created in header 116 and are assigned to the corresponding addresses within mapped NVM block 135. The corresponding address in the present example is identified by determining a first 64-bit aligned address following an end of the descriptive information.

FIGS. 2 through 5 may illustrate writing and loading of any type of data to and from NVM. Some embodiments may be used to persist and load structures of database data.

Figure 6:
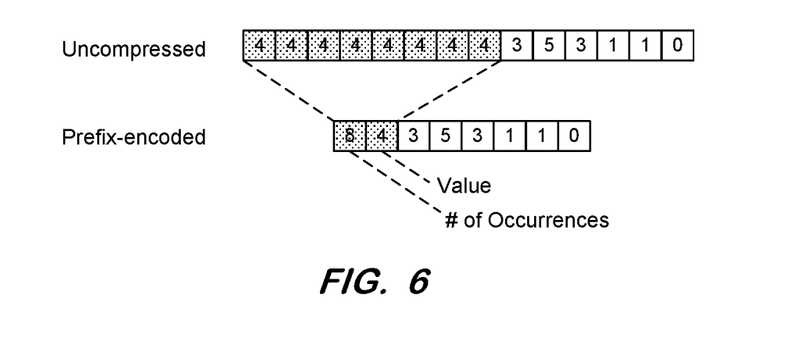
FIG. 6 illustrates prefix-encoding of a vector of values according to some embodiments.

FIG. 6 illustrates prefix-encoding of a vector of value IDs according to some embodiments. The example uncompressed vector of FIG. 6 includes fourteen value IDs. As described above, each of these value IDs may point to a dictionary entry including a column value. As shown, any value which is repeated at the beginning of the uncompressed vector is stored once in the prefix-encoded vector, preceded by the number of consecutive occurrences of the value.

Figure 7:
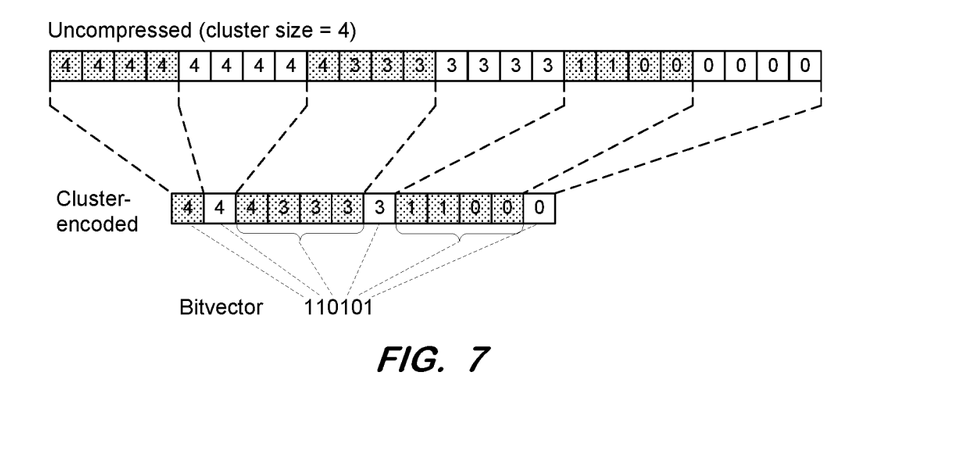
FIG. 7 illustrates cluster-encoding of a vector of values according to some embodiments.

FIG. 7 illustrates cluster-encoding of a vector of value IDs according to some embodiments. In cluster encoding, the vector is divided into clusters of n entries. If all entries (i.e., value IDs) of a particular cluster include a single value, the cluster-encoded vector stores only a single occurrence of that value. A bitvector indicates which clusters are represented by a single value ("1") in the cluster-encoded vector, and which clusters are duplicated exactly (i.e., uncompressed) in the cluster-encoded vector ("0").

Figure 8:
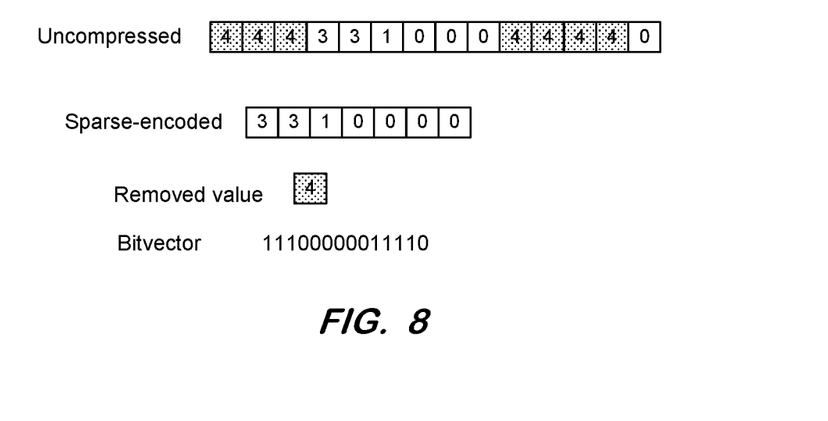
FIG. 8 illustrates sparse-encoding of a vector of values according to some embodiments.

FIG. 8 illustrates sparse-encoding of a vector of value IDs according to some embodiments. The most frequently-appearing value in the vector is determined and all entries containing the value are removed, resulting in a sparse-encoded vector. The removed value is stored separately, along with a bitvector including a single bit for each entry of the uncompressed vector. As shown, a bit associated with a vector entry is set to zero if the entry does not include the removed value, and to 1 if the entry includes the removed value.

Figure 9:
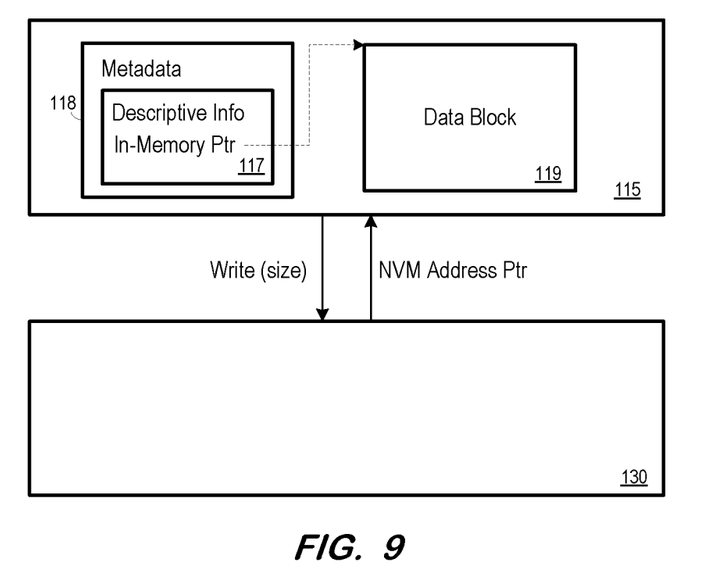
FIG. 9 illustrates an in-memory data representation of an encoded column vector according to some embodiments.
Figure 10:
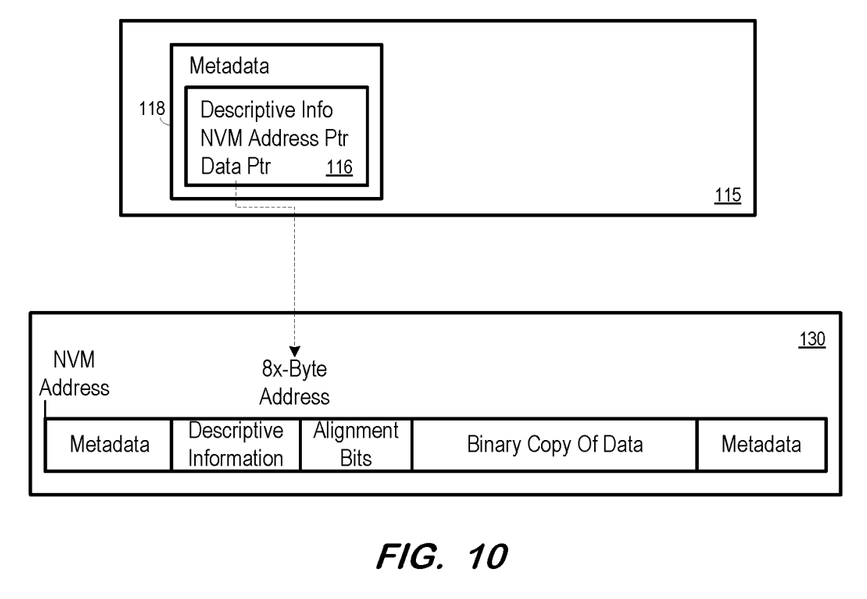
FIG. 10 illustrates writing in-memory data of an encoded column vector to non-volatile memory according to some embodiments.

FIGS. 9 and 10 illustrate writing and loading a compressed vector such as those illustrated by FIGS. 6 through 8 to/from NVM 130 according to some embodiments. As shown, writing and loading of a thusly-compressed vector may leverage some of the generic index implementation described with respect to FIGS. 2 through 5.

For example, header 118 of FIG. 9 includes header 117 described above as well as additional metadata. In the case of a prefix-encoded vector, the additional metadata may include a version number, a maximum value ID (i.e., indicating a number of entries prefix-encoded vector), and a size of each index entry (e.g., 8 bits). In the case of a cluster-encoded vector, the metadata may further include the corresponding bitvector. In the case of a sparse-encoded vector, the metadata may include the corresponding bitvector and removed value. Data block 119 may comprise a logical array with each array position representing a vector position.

During serialization as depicted in FIG. 10, the metadata is stored at an NVM address provided by NVM 130 as described above, followed by the descriptive information of header 117, which is in turn followed by a number of alignment bits which results in a next memory address to be 64-bit aligned. A binary copy of data block 119 is stored at this next memory address. Also shown is a second portion of metadata stored immediately after the binary copy of data block 119. This second portion may comprise metadata relating to the compressed vector, such as a create duration.

During deserialization, similarly to the above description of FIGS. 4 and 5, the metadata is copied from the NVM start address into a first DRAM header structure, and the following descriptive information is copied into a second header structure within the first header structure. A data pointer is determined based on the NVM start address, the length of the metadata, the length of the descriptive information and on a number of alignment bits needed to reach a next 64-bit aligned memory address in NVM 130.

Figure 11A:
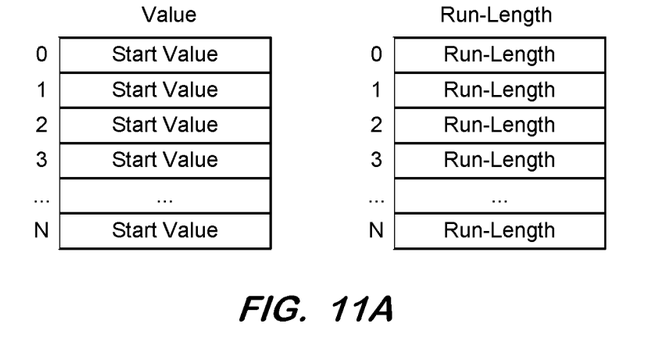
FIGS. 11A and 11B illustrate a run-length-encoded column vector according to some embodiments.
Figure 11B:
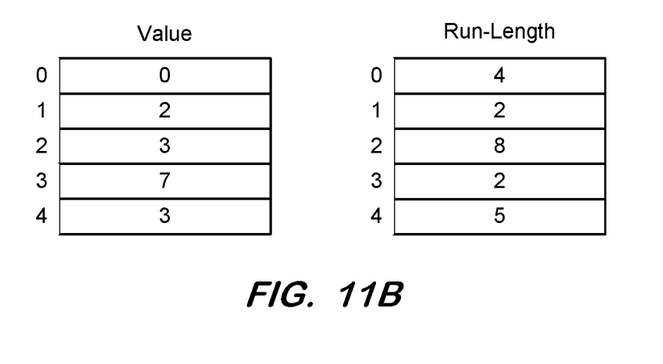

FIGS. 11A and 11B illustrate representations of a column vector of value IDs according to some embodiments. The representations illustrate run-length encoding in which a column vector consists of two index vectors (a Value vector and a Run-length vector) which, together, associate row positions of a table column with value IDs stored in a dictionary. The use of two vectors, each having entries of a minimal fixed bit size, provides a column vector which may be persisted into and loaded from NVM by leveraging techniques described above with respect to a generic index vector.

FIG. 11A depicts the syntax of the Value vector and the Run-length vector. Each entry of the Value vector includes a value ID. Each row of the Run-length vector maps a position of the Value vector to a run-length, which is a number of consecutive appearances of a value within the vector. Turning to the specific example of FIG. 11B, row position 0 corresponds to a value ID of 0 according to the Value vector, and to a row length of 4 according to the Run-length vector. Accordingly, the value ID 0 is stored at the first four row positions (i.e., positions 0, 1, 2, and 3) of the corresponding column vector. Continuing the example, the value ID 2 is stored at the next two row positions, the value ID 3 is stored at the next eight row positions, the value ID 7 is stored at the next two row positions, and the value ID 3 is stored at the next five row positions.

In other embodiments, the Run-length vector is replaced with a Start Row vector. The Start Row vector maps a position of the Value vector to a start row of a run of the value at the position. Such an embodiment may facilitate scanning of the encoded column vector.

Figure 12:
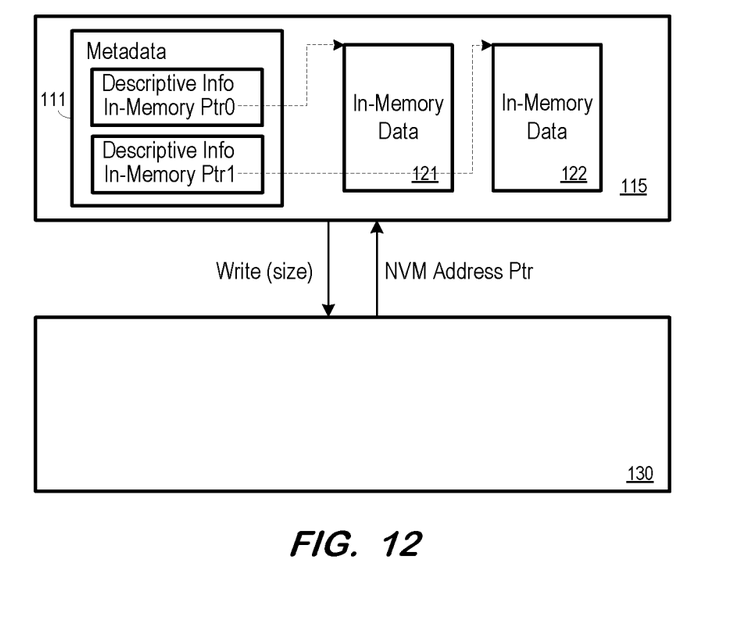
FIG. 12 illustrates an in-memory data representation of a column vector according to some embodiments.
Figure 13:
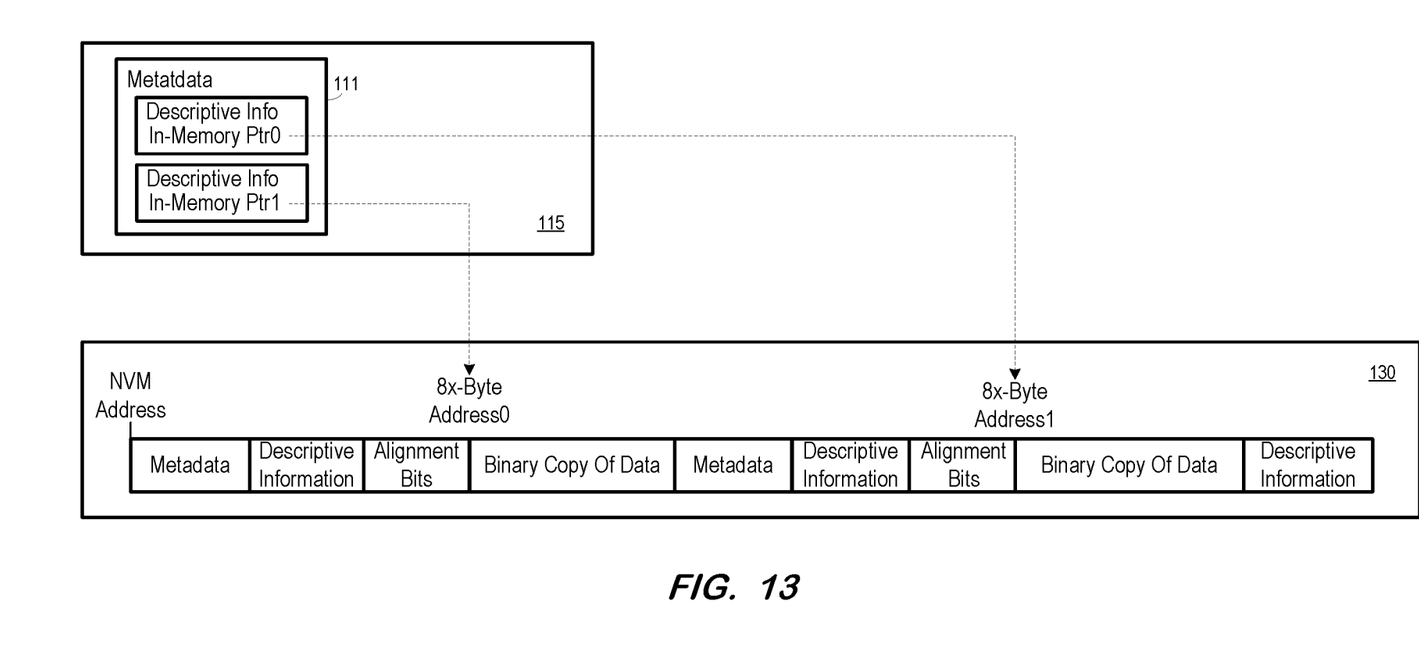
FIG. 13 illustrates writing in-memory data of a column vector to non-volatile memory according to some embodiments.

FIGS. 12 and 13 illustrate writing and loading the compressed column vector of FIGS. 11A and 11B to/from NVM 130 according to some embodiments. As shown, writing and loading of the compressed vector may leverage some of the generic index implementation described with respect to FIGS. 2 through 5.

FIG. 12 shows header 111 including metadata as well as two sub-headers. Each of the sub-headers corresponds to one of a Value vector and a Run-length vector and includes descriptive information and a pointer as described above with respect to header 117. The metadata may include a version number, a maximum vector position, a size of the Value vector and a size of the Run-length vector.

Each of data blocks 121 and 122 may therefore correspond to one of the Value vector and the Run-length vector. Each of data blocks 121 and 122 may comprise a logical array with each array position representing a vector position. Each vector position may be of a size (e.g., n bits) specified in the additional metadata of header 111.

FIG. 13 depicts mapping of the data structures of FIG. 12 to NVM 130. The metadata is stored at an NVM address provided by NVM 130 as described above, followed by the descriptive information of the sub-header associated with the Value vector, which is in turn followed by a number of alignment bits which results in a next memory address to be 64-bit aligned. A binary copy of data block 121 is stored at this next memory address.

A second portion of metadata is stored immediately after the binary copy of data block 119. This second portion of descriptive information may specify a size of the Run-length vector, and is followed by the descriptive information of the sub-header associated with the Run-length vector and a number of alignment bits which results in a next memory address to be 64-bit aligned. A binary copy of data block 122 is stored at this next memory address, followed by additional metadata relating to the compressed column vector index, such as a create duration.

During deserialization, similarly to the above description of FIGS. 4 and 5, the metadata is copied from the NVM start address into a first DRAM header structure, and the following descriptive information is copied into a second header structure within the first header structure. A data pointer is determined based on the NVM start address, the length of the metadata, the length of the descriptive information and on a number of alignment bits needed to reach a next 64-bit aligned memory address in NVM 130.

Upon loading of the data back into DRAM 115, only descriptive information and pointers to content data are kept in DRAM 115, with the pointers being switched from DRAM addresses to corresponding addresses of the mapped NVM block. With the data structures of the NVM block being mapped in the virtual address space, the binary copies of data may be accessed directly from NVM 130 using their 8×-byte addresses during all subsequent accesses.

Embodiments are not limited to the types of compressed column vectors described above.

According to some embodiments, it is determined prior to serialization that a binary copy of data as described herein need not be memory-aligned. For example, a data substructure represented by a binary copy might not be subjected to processing which would benefit from data alignment. Accordingly, serialization and deserialization of that substructure will not take into account alignment bits as described herein. Such an implementation would not prevent the use of data alignment with respect to other substructures.

Figure 14:
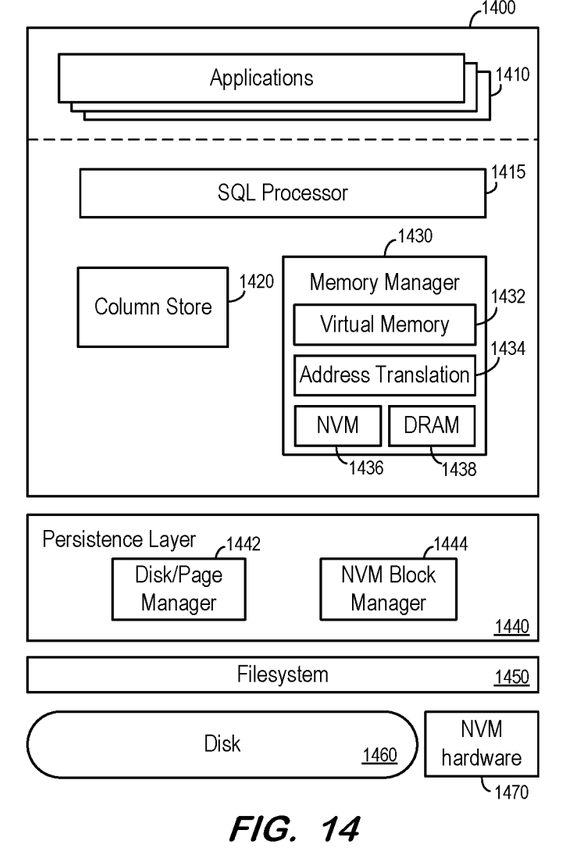
FIG. 14 is a block diagram of a database architecture according to some embodiments.

FIG. 14 is a block diagram of an implementation of database system 110, persistent storage 120 and NVM 130 of FIG. 1. Embodiments are not limited to the illustrated elements of FIG. 14. The illustrated elements may be implemented by any suitable combinations of hardware and software as is known in the art. Such combinations may include one or more processing units (microprocessors, central processing units, microprocessor cores, execution threads), one or more non-transitory storage media, and processor-executable software code.

Each column in a columnar data store may be logically split into a delta fragment and a main fragment. The delta fragment of a column is optimized for write access in disk and in memory, while the main column fragment is optimized for read access in disk and memory. According to some embodiments, each main column fragment is associated with an NVM block which stores large memory allocations of the main column fragment. Thus, when a main column fragment is loaded into memory, its large data structures are no longer allocated in DRAM and initialized from disk. Instead, the main column fragment being loaded locates its associated NVM block and points its large data structures directly into the NVM block.

The lifecycle of a main column fragment is driven by periodic merges of a corresponding delta column fragment into the main column fragment and Data Description Language statements (DDLs). According to some embodiments, and regardless of how it is initiated, the creation of a new main column fragment triggers the creation of a new NVM block and the removal of a main column fragment triggers the removal of its NVM block. Also, if the removal of a main column fragment is undone, the removal of its associated NVM block is undone. Similarly, and according to some embodiments, if the creation of a main column fragment is undone, the creation of its associated NVM block is undone and the NVM block is removed. If the creation of a main column fragment is redone, the creation of its associated NVM block is also redone.

System 1400 includes SQL processor 1415, which receives SQL statements from one or more client systems as is known in the art (not shown). The SQL statements may include DDLs, queries, and Data Manipulation Language statements. Handling of received queries may require the retrieval of data from column store 1420. Column store 1420 stores tabular data of a database as is known in the art. DDLs may be handled by creating, deleting or altering a column of column store 1420. According to some embodiments, new columns are constructed by column store 1420 and persisted to NVM as described herein if appropriate.

Column store 1420 uses memory manager 1430 to retrieve data from NVM 1436 and DRAM 1438. According to some embodiments, NVM 1436 is used to store column dictionaries and column vectors. Each column (or column fragment, representing a partitioned portion of a column) is associated with an NVM block containing its data. In some embodiments, smaller intermediate data structures (e.g., row counts of most-common values, access and usage statistics, bit vector of null values) of columns are allocated in DRAM 1438. All delta and MVCC data structures may be allocated in DRAM 1438, as are intermediate results of query processing.

For columns associated with an NVM block, column store 1420 constructs an NVM block key and uses the key to request a pointer from memory manager 1430. Memory manager 1430 maps the NVM block into an address of virtual memory 1432 via address translation 1434. This address is passed back to column store 1420, which then points the index vector and dictionary of the in-memory representation of the main column fragment directly into the NVM block.

Memory allocations (including those of the NVM blocks) are mapped to different addresses of virtual memory 1432 via address translation 1434. NVM blocks are not mapped into virtual memory 1432 on restart. As described below, NVM blocks are instead mapped on a first read/write request over them issued by an application.

Persistence layer 1440 include disk/page manager 1442 to control disk-based filesystem 1450 for writing to and reading from data volumes and log volumes stored on disk 1460. Similarly, persistence layer 1440 includes NVM block manager 1444 to control an NVM-based filesystem to manage NVM blocks of NVM hardware 1470 used to store columnar data. NVM 1436 and NVM hardware 1470 represent the same physical hardware and the separate depiction in FIG. 14 is to illustrate a conceptual relationship. Specifically, the relation is that NVM "files" 1436 are mapped into the virtual memory 1432 when the NVM blocks are loaded, and the contents of the NVM files are stored in NVM 1470.

According to some embodiments, NVM block manager 1444 facilitates consistent persistent memory management so that the upper database layers can efficiently exploit the persistent NVM space without having to consider allocation, deallocation, data durability, persistent memory leaks, and recovery of data after a restart. NVM block manager 1444 is based upon memory-mapped files, thereby leveraging the load/store capabilities of persistent memory while also compatible with other storage technologies (e.g., Solid State Disks).

In some embodiments, the implementation model of NVM block manager 1444 is based on a root directory of the mounted filesystems. The root directory may be the location at which the persistent memory devices (i.e., DIMMs) are mounted. The physical location may be DAX-enabled, which is a Linux feature added for persistent memory storage. If supported, the DAX bypasses the kernel page cache which is usually used to buffer reads/writes into files.

For file-based mappings, the persistent memory space is mapped directly into virtual memory 1432. All the NVM-resident blocks are stored under a root directory and, at startup, these blocks are loaded from the root directory as described below. The NVM physical block lifecycle management is aligned with the savepoint logic of the database and is similarly initiated by a savepoint/restart/crash. NVM block manager 1444 keeps track of the savepoint version of the system at the time of creation of a new NVM block and uses the information to handle blocks during associated events (e.g., savepoint/restart/crash), which simplifies the corresponding handling of these events by the upper layers.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A database system comprising:
a volatile random access memory storing first header data, second header data, a first logical array in a first contiguous memory block and a second logical array in a second contiguous memory block, with each array position of the first logical array storing database column value, with each array position of the second logical array storing an indication of a number of consecutive occurrences of a database column value, with the first header data comprising a first pointer to the first contiguous memory block, and with the second header data comprising a second pointer to the second contiguous memory block;
a non-volatile random access memory; and
a processing unit to:
determine a first number of alignment bits based on a size of the first header data to be written to the non-volatile random access memory and to ensure that a start address of a binary copy of the first contiguous memory block in the non-volatile random access memory is evenly divisible by a predetermined number of bits;
determine a second number of alignment bits based on a size of the binary copy of the first contiguous memory block and the second header data to be written to the non-volatile random access memory, and to ensure that a start address of a binary copy of the second contiguous memory block in the non-volatile random access memory is evenly divisible by the predetermined number of bits;
determine a memory size associated with the first header data, the second header data, the first number of alignment bits, the first contiguous memory block, the second number of alignment bits, and the second contiguous memory block;
allocate a memory block of the non-volatile random access memory based on the determined memory size;
determine an address of the non-volatile random access memory associated with the allocated memory block; and
write a portion of the first header data, the first number of alignment bits, the binary copy of the first contiguous memory block, a portion of the second header data, the second number of alignment bits, and the binary copy of the second contiguous memory block at the address of the non-volatile random access memory.

2. A database system according to claim 1, wherein writing of the portion of the first header data, the first number of alignment bits, the binary copy of the first contiguous memory block, the portion of the second header data, the second number of alignment bits, and the binary copy of the second contiguous memory block comprises:
  contiguously writing of the portion of the first header data, the first number of alignment bits, the binary copy of the first contiguous memory block, the portion of the second header data, the second number of alignment bits, and the binary copy of the second contiguous memory block.

3. A database system according to claim 1, the volatile random access memory storing third header data comprising the first header data, the second header data, and column vector header data, the column vector header data comprising a number of array positions in the first logical array and a number of array positions in the second logical array,
  wherein writing of the portion of the first header data, the first number of alignment bits, the binary copy of the first contiguous memory block, the portion of the second header data, the second number of alignment bits, and the binary copy of the second contiguous memory block comprises:
  contiguously writing of a portion of the column vector header data, the portion of the first header data, the first number of alignment bits, the binary copy of the first contiguous memory block, a second portion of the column vector header data, the portion of the second header data, the second number of alignment bits, and the binary copy of the second contiguous memory block.

4. A database system according to claim 3, wherein
  determination of the first number of alignment bits is based at least in part on a size of the portion of the column vector header data and the portion of the first header data to be written to the non-volatile random access memory; and
  wherein determination of the second number of alignment bits is based at least in part on a size of the second portion of the column vector header data and the portion of the second header data to be written to the non-volatile random access memory.

5. A database system according to claim 4, the processing unit further to:
  determine the address associated with the allocated memory block of the non-volatile random access memory;
  deserialize the first portion of the column vector header data, and the portion of the first header data written at the address associated with the allocated memory block of the non-volatile random access memory;
  copy the deserialized information into fourth header data stored in the volatile random access memory;
  determine a first pointer to the start address of the binary copy of the first contiguous memory block in the non-volatile random access memory;
  deserialize the second portion of the column vector header data, and the portion of the second header data written immediately after the binary copy of the first contiguous memory in the non-volatile random access memory;
  copy the deserialized second portion of the column vector header data, and portion of the second header data into the fourth header data stored in the volatile random access memory;
  determine a second pointer to the start address of the binary copy of the second contiguous memory block in the non-volatile random access memory; and
  store the first pointer and the second pointer in the fourth header data stored in the volatile random access memory.

6. A database system according to claim 5,
  wherein determination of the first pointer comprises determination of a next memory address following the first portion of the column vector header data and the portion of the first header data written at the address associated with the allocated memory block of the non-volatile random access memory which is evenly divisible by the predetermined number of bits, and
  wherein determination of the second pointer comprises determination of a next memory address following the second portion of the column vector header data and the portion of the second header data written at an address following the binary copy of the second contiguous memory block in the non-volatile random access memory which is evenly divisible by the predetermined number of bits.

7. A computer-implemented method, comprising:
  storing, in a volatile random access memory, first header data, second header data, a first logical array in a first contiguous memory block and a second logical array in a second contiguous memory block, with each array position of the first logical array storing a database column value, with each array position of the second logical array storing an indication of a number of consecutive occurrences of a database column value, with the first header data comprising a first pointer to the first contiguous memory block, and with the second header data comprising a second pointer to the second contiguous memory block;
  determining a first number of alignment bits based on a size of the first header data to be written to a non-volatile random access memory and to ensure that a start address of a binary copy of the first contiguous memory block in the non-volatile random access memory is evenly divisible by a predetermined number of bits;
  determining a second number of alignment bits based on a size of the binary copy of the first contiguous memory block and the second header data to be written to the non-volatile random access memory, and to ensure that a start address of a binary copy of the second contiguous memory block in the non-volatile random access memory is evenly divisible by the predetermined number of bits;
  determining a memory size associated with the first header data, the second header data, the first number of alignment bits, the first contiguous memory block, the second number of alignment bits, and the second contiguous memory block;
  allocating a memory block of non-volatile random access memory based on the determined memory size;
  determining an address of the non-volatile random access memory associated with the allocated memory block; and
  writing a portion of the first header data, the first number of alignment bits, the binary copy of the first contiguous memory block, a portion of the second header data, the second number of alignment bits, and the binary copy of the second contiguous memory block at the address of the non-volatile random access memory.

8. A computer-implemented method according to claim 7, wherein writing the portion of the first header data, the first number of alignment bits, the binary copy of the first contiguous memory block, the portion of the second header data, the second number of alignment bits, and the binary copy of the second contiguous memory block comprises:

contiguously writing the portion of the first header data, the first number of alignment bits, the binary copy of the first contiguous memory block, the portion of the second header data, the second number of alignment bits, and the binary copy of the second contiguous memory block.

9. A computer-implemented method according to claim 7, the volatile random access memory storing third header data comprising the first header data, the second header data, and column vector header data, the column vector header data comprising a number of array positions in the first logical array and a number of array positions in the second logical array, wherein writing the portion of the first header data, the first number of alignment bits, the portion of the second header data, the binary copy of the first contiguous memory block, the second number of alignment bits, and the binary copy of the second contiguous memory block comprises:

contiguously writing a portion of the column vector header data, the portion of the first header data, the first number of alignment bits, the binary copy of the first contiguous memory block, a second portion of the column vector header data, the portion of the second header data, the second number of alignment bits, and the binary copy of the second contiguous memory block.

10. A computer-implemented method according to claim 9, wherein determining the first number of alignment bits is based at least in part on a size of the portion of the column vector header data and the portion of the first header data to be written to the non-volatile random access memory; and wherein determining the second number of alignment bits is based at least in part on a size of the second portion of the column vector header data and the portion of the second header data to be written to the non-volatile random access memory.

11. A computer-implemented method according to claim 10, further comprising:

determining the address associated with the allocated memory block of the non-volatile random access memory;

deserializing the first portion of the column vector header data, and the portion of the first header data written at the address associated with the allocated memory block of the non-volatile random access memory;

copying the deserialized information into fourth header data stored in the volatile random access memory;

determining a first pointer to the start address of the binary copy of the first contiguous memory block in the non-volatile random access memory;

deserializing the second portion of the column vector header data, and the portion of the second header data written immediately after the binary copy of the first contiguous memory in the non-volatile random access memory;

copying the deserialized second portion of the column vector header data, and portion of the second header data into the fourth header data stored in the volatile random access memory;

determining a second pointer to the start address of the binary copy of the second contiguous memory block in the non-volatile random access memory; and storing the first pointer and the second pointer in the fourth header data stored in the volatile random access memory.

12. A computer-implemented method according to claim 11, wherein determining the first pointer comprises determination of a next memory address following the first portion of the column vector header data and the portion of the first header data written at the address associated with the allocated memory block of the non-volatile random access memory which is evenly divisible by the predetermined number of bits, and wherein determining the second pointer comprises determination of a next memory address following the second portion of the column vector header data and the portion of the second header data written at an address following the binary copy of the second contiguous memory block in the non-volatile random access memory which is evenly divisible by the predetermined number of bits.

13. A database system comprising:

a volatile random access memory storing first header data, and storing a first logical array in a first contiguous memory block, with the first logical array comprising a compressed vector of database column values, and with the first header data comprising a first pointer to the first contiguous memory block and data usable to decompress the compressed vector;

a non-volatile random access memory; and a processing unit to:

determine a first number of alignment bits based on a size of the first header data to be written to the non-volatile random access memory and to ensure that a start address of a binary copy of the first contiguous memory block in the non-volatile random access memory is evenly divisible by a predetermined number of bits;

determine a memory size associated with the first header data, the first number of alignment bits, and the first contiguous memory block;

allocate a memory block of the non-volatile random access memory based on the determined memory size;

determine an address of the non-volatile random access memory associated with the allocated memory block; and write a portion of the first header data, the first number of alignment bits, and the binary copy of the first contiguous memory block at the address of the non-volatile random access memory.

14. A database system according to claim 13, wherein writing of the portion of the first header data, the first number of alignment bits, and the binary copy of the first contiguous memory block comprises:

contiguously writing of the portion of the first header data, the first number of alignment bits, and the binary copy of the first contiguous memory block.

15. A database system according to claim 13, the volatile random access memory storing second header data comprising the first header data, and column vector header data, the column vector header data comprising a number of array positions in the first logical array, wherein writing of the portion of the first header data, the first number of alignment bits, and the binary copy of the first contiguous memory block comprises:
contiguously writing of a portion of the column vector header data, the portion of the first header data, the first number of alignment bits, and the binary copy of the first contiguous memory block, a second portion of the column vector header data.

16. A database system according to claim 15, wherein determination of the first number of alignment bits is based at least in part on a size of the portion of the column vector header data and the portion of the first header data to be written to the non-volatile random access memory and on a desired bit alignment of a start address of the binary copy of the first contiguous memory block in the non-volatile random access memory.

17. A database system according to claim 16, the processing unit further to:
determine the address associated with the allocated memory block of the non-volatile random access memory;
deserialize the portion of the column vector header data, and the portion of the first header data written at the address associated with the allocated memory block of the non-volatile random access memory;
copy the deserialized information into third header data stored in the volatile random access memory;
determine a first pointer to the start address of the binary copy of the first contiguous memory block in the non-volatile random access memory; and
store the first pointer in the second header data stored in the volatile random access memory.

* * * * *